United States Patent
Nakagami et al.

(10) Patent No.: US 10,587,892 B2
(45) Date of Patent: Mar. 10, 2020

(54) IMAGE PROCESSING APPARATUS, IMAGE PROCESSING METHOD, AND PROGRAM FOR GENERATING MOTION COMPENSATED IMAGE DATA

(71) Applicant: SONY CORPORATION, Tokyo (JP)

(72) Inventors: Ohji Nakagami, Tokyo (JP); Junichi Tanaka, Kanagawa (JP); Yoichi Yagasaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/471,108

(22) Filed: Aug. 28, 2014

(65) Prior Publication Data

US 2015/0043646 A1 Feb. 12, 2015

Related U.S. Application Data (63) Continuation of application No. 12/664,208, filed as application No. PCT/JP2008/060581 on Jun. 10, 2008, now Pat. No. 8,885,716.

(30) Foreign Application Priority Data

Jun. 18, 2007 (JP) ................................ 2007-160589

(51) Int. Cl.
  *H04N 19/573* (2014.01)
  *H04N 5/14* (2006.01)
  (Continued)

(52) U.S. Cl.
  CPC .......... *H04N 19/573* (2014.11); *H04N 5/145* (2013.01); *H04N 5/772* (2013.01); *H04N 5/91* (2013.01);
  (Continued)

(58) Field of Classification Search
  CPC .......... H04N 5/145; H04N 5/772; H04N 5/91; H04N 7/0132; H04N 7/014; H04N 9/8045;
  (Continued)

(56) References Cited

U.S. PATENT DOCUMENTS 5,142,616 A 8/1992 Kellar et al.
5,809,202 A 9/1998 Gotoh et al.
(Continued)

FOREIGN PATENT DOCUMENTS

JP 7-23322 1/1995
JP 8-298644 11/1996
(Continued)

OTHER PUBLICATIONS

Jan. 8, 2013, Japanese Office Action issued for related application No. JP2011-196202.
(Continued)

*Primary Examiner* — Mohammed Jebari
(74) *Attorney, Agent, or Firm* — Paratus Law Group, PLLC (57) ABSTRACT

There is provided an image processing apparatus including a an acquiring unit for acquiring moving image data containing a plurality of successive frames, and one or a plurality of image data corresponding to the frames and having a spatial resolution higher than the frames; a motion prediction unit for detecting a motion vector between the frames using the moving image data; a difference amount calculation unit for calculating a difference amount between a predetermined frame and the frame corresponding to the image data; and an image generation unit capable of generating motion compensated image data corresponding to the predetermined frame based on the frame corresponding to the image data and the motion vector.

16 Claims, 7 Drawing Sheets

(51) Int. Cl.

| | | |
|---|---|---|
| *H04N 5/77* | (2006.01) | |
| *H04N 7/01* | (2006.01) | |
| *H04N 9/804* | (2006.01) | |
| *H04N 5/91* | (2006.01) | |
| *H04N 19/105* | (2014.01) | |
| *H04N 19/176* | (2014.01) | |
| *H04N 19/59* | (2014.01) | |
| *H04N 19/33* | (2014.01) | |
| *H04N 19/51* | (2014.01) | |
| *H04N 19/11* | (2014.01) | |
| *H04N 19/139* | (2014.01) | |

(52) U.S. Cl.
CPC ........... *H04N 7/014* (2013.01); *H04N 7/0132* (2013.01); *H04N 9/8045* (2013.01); *H04N 19/105* (2014.11); *H04N 19/11* (2014.11); *H04N 19/139* (2014.11); *H04N 19/176* (2014.11); *H04N 19/33* (2014.11); *H04N 19/51* (2014.11); *H04N 19/59* (2014.11)

(58) Field of Classification Search
CPC .... H04N 19/59; H04N 19/139; H04N 19/573; H04N 19/105; H04N 19/176; H04N 19/51; H04N 19/33; H04N 19/11
See application file for complete search history.

(56) References Cited

U.S. PATENT DOCUMENTS

| | | |
|---|---|---|
| 5,821,986 A | 10/1998 | Xiancheng et al. |
| 6,285,804 B1 | 9/2001 | Crinon et al. |
| 6,507,859 B1 | 1/2003 | Omori et al. |
| 6,611,625 B1 * | 8/2003 | Son et al. ............... 382/238 |
| 2002/0106129 A1 | 8/2002 | Yadid-Pecht |
| 2002/0154697 A1 | 10/2002 | Jeon |
| 2004/0264576 A1 | 12/2004 | Woods et al. |
| 2005/0219642 A1 | 10/2005 | Yachida et al. |
| 2006/0126952 A1 | 6/2006 | Suzuki et al. |
| 2007/0189386 A1 * | 8/2007 | Imagawa et al. ........ 375/240.12 |
| 2007/0189389 A1 | 8/2007 | Boisson et al. |
| 2008/0175519 A1 | 7/2008 | Nagumo |
| 2008/0292002 A1 * | 11/2008 | Amon et al. ............. 375/240.24 |
| 2010/0142614 A1 * | 6/2010 | Pandit et al. ............ 375/240.02 |

FOREIGN PATENT DOCUMENTS

| | | |
|---|---|---|
| JP | 2004-312276 | 11/2004 |
| JP | 2004-312277 | 11/2004 |
| JP | 2005-318548 | 11/2005 |
| JP | 2007-096709 | 4/2007 |
| WO | WO2006/137253 A1 | 12/2006 |

OTHER PUBLICATIONS

Jan. 8, 2013, Japanese Office Action issued for related application No. JP2011-196203.

Notification of Reasons for Refusal with English language translation issued by Japanese Patent Office dated Jun. 28, 2011, in corresponding Japanese application No. 2007-160589.

T. Matsunobu et al., "Generation of High Resolution Video Using Morphing", The IEICE Transactions on Information and Systems, vol. J90-D, No. 4, pp. 1073-1083 (2007).

European Search Report dated Dec. 27, 2010 from the European Patent Office for European Patent Application No. 08765370.5-2223/2161929.

* cited by examiner

IMAGE PROCESSING APPARATUS, IMAGE PROCESSING METHOD, AND PROGRAM FOR GENERATING MOTION COMPENSATED IMAGE DATA

CROSS REFERENCE TO PRIOR APPLICATION

This application is a continuation of U.S. patent application Ser. No. 12/664,208 (filed on Dec. 11, 2009; and issued on Nov. 11, 2014 as U.S. Pat. No. 8,885,716), which is a National Stage Patent Application of PCT International Patent Application No. PCT/JP2008/060581 (filed on Jun. 10, 2008) under 35 U.S.C. § 371, which claims priority to Japanese Patent Application No. 2007-160589 (filed on Jun. 18, 2007), which are all hereby incorporated by reference in their entirety.

TECHNICAL FIELD

The present invention relates to an image processing apparatus, an image processing method, and a program.

BACKGROUND ART

In recent years, a technique related to distribution of digital video data (hereinafter referred to as video data) has been greatly advancing. Specifically, development in the technique related to distribution and recording of high image quality video data is outstanding. Among them, attention has been given to the technique related to coding and decoding of the video data. The video data having high spatial resolution and temporal resolution has a very large data size and thus such video data is desirably distributed or recorded by being efficiently compressed after coding. To this end, the coding technique enabling the high image quality video data to be compressed at higher compression rate, and the technique of decoding the same so as to reproduce at higher spatial resolution are desired.

For instance, Patent Documents 1 and 2 disclose a basic technique for generating the video data having high spatial resolution and temporal resolution by combining first video data (e.g., moving image data etc.) which has low spatial resolution but high temporal resolution and second video data (e.g., series of still image data etc.) which has high spatial resolution but low temporal resolution. Such technique predicts the motion vector between frames from the first video data, and compensates the high frequency component of the first video data using the motion vector and the second video data. Such technique generates a frame of an arbitrary time point not contained in the second video data using the motion vector detected from the first video data and the frame of the second video data at a time point close to such arbitrary time point. The Patent Documents 1 and 2 include a description related to an image data recording and reproducing device for generating video data having high spatial resolution and temporal resolution using the above-described technique.

PRIOR ART DOCUMENT

[Patent document 1] Japanese Patent Application Laid-Open No. 2004-312276
[Patent document 2] Japanese Patent Application Laid-Open No. 2004-312277

DISCLOSURE OF INVENTION

However, since the image data recording and reproducing device mentioned above performs motion prediction and motion compensation using the video data having different spatial resolutions, noise is added to the high frequency component of the video data obtained by motion compensation if the movement predication is off.

In light of the foregoing, it is desirable to provide a novel and improved image processing apparatus, an image processing method, and a program capable of preventing noise from being added to the high frequency component of the image data when generating the image data of high spatial resolution by motion predicting with the image data series of low spatial resolution and motion compensating using the image data of high spatial resolution.

According to an embodiment of the present invention, there is provided an image processing apparatus which includes an acquiring unit for acquiring moving image data containing a plurality of successive frames, and one or a plurality of image data corresponding to the frames and having a spatial resolution higher than the frames; a motion prediction unit for detecting a motion vector between the frames using the moving image data; a difference amount calculation unit for calculating a difference amount between an arbitrary frame and the frame corresponding to the image data; and an image generation unit for generating motion compensated image data corresponding to the arbitrary frame based on the frame corresponding to the image data and the motion vector. Furthermore, the image generation unit generates the motion compensated image data having a spatial resolution same as the image data if the difference amount is smaller than a predetermined value, and generates image data in which the arbitrary frame is magnified to a spatial resolution same as the image data if the difference amount is greater than the predetermined value.

The image processing apparatus may further include a storage unit for recording the moving image data and the one or the plurality of image data. The acquiring unit acquires the moving image data and the one or the plurality of image data recorded in the storage unit.

Furthermore, the storage unit may be recorded with a first image data series having low spatial resolution and high temporal resolution as the moving image data, and a second image data series having higher spatial resolution and lower temporal resolution than the first image data series so as to correspond to the frame contained in the first image data series as the one or the plurality of image data.

Furthermore, the image generation unit may generate, with a frame contained in the first image data series and not contained in the second image data series as the arbitrary frame, the image data corresponding to the arbitrary frame, and enhances the temporal resolution of the second image data series.

Furthermore, the storage unit may be recorded with an image data series obtained by down sampling an imaged image signal as the moving image data.

Furthermore, the image generation unit may change a ratio of combining the arbitrary frame, which is a reference source of the motion vector, and the image data, which is a reference destination of the motion vector, according to the difference amount in the motion compensation if the difference amount is greater than the predetermined value.

According to another embodiment of the present invention, there is provided an image processing method, including the steps of acquiring moving image data containing a plurality of successive frames, and one or a plurality of image data corresponding to the frames and having a spatial resolution higher than the frames; detecting a motion vector between the frames using the moving image data; calculating a difference amount between a predetermined frame and the frame corresponding to the image data; and generating motion compensated image data corresponding to the arbitrary frame based on the frame corresponding to the image data and the motion vector. Furthermore, in the image generation step, the motion compensated image data having a spatial resolution same as the image data is generated if the difference amount is smaller than a predetermined value, and image data in which the arbitrary frame is magnified to a spatial resolution same as the image data is generated if the difference amount is greater than the predetermined value.

According to another embodiment of the present invention, there is provided program for causing a computer to realize the functions of acquiring moving image data containing a plurality of successive frames, and one or a plurality of image data corresponding to the frames and having a spatial resolution higher than the frames; detecting a motion vector between the frames using the moving image data; calculating a difference amount between an arbitrary frame and the frame corresponding to the image data; and generating motion compensated image data corresponding to the arbitrary frame based on the frame corresponding to the image data and the motion vector, the motion compensated image data having a spatial resolution same as the image data being generated if the difference amount is smaller than a predetermined value, and image data in which the arbitrary frame is magnified to a spatial resolution same as the image data being generated if the difference amount is greater than the predetermined value.

According to the embodiments of the present invention described above, when generating image data of high spatial resolution by motion predicting with the image data series of low spatial resolution and motion compensating using the image data of high spatial resolution, the noise is prevented from being added to the high frequency component of the relevant image data.

100 image processing apparatus
102 imaging lens
104 imaging element
106 image generation timing controller
108 display circuit
110 camera signal processing block
112 A/D converter
114 digital signal processing circuit
120 reproducing block
122,132 storage unit
124 moving image compression/decompression circuit
126 image density conversion circuit
130 still image recording and reproducing block
134 still image compression/decompression circuit
140 image generation block
142 motion prediction circuit
144 motion compensation circuit
146 differential image determination circuit
HRP high resolution picture
LRP low resolution picture
MP magnified pictures
CP,CP' Created Picture

BEST MODE FOR CARRYING OUT THE INVENTION

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(Generation Method of High Resolution Image)

Figure 1:
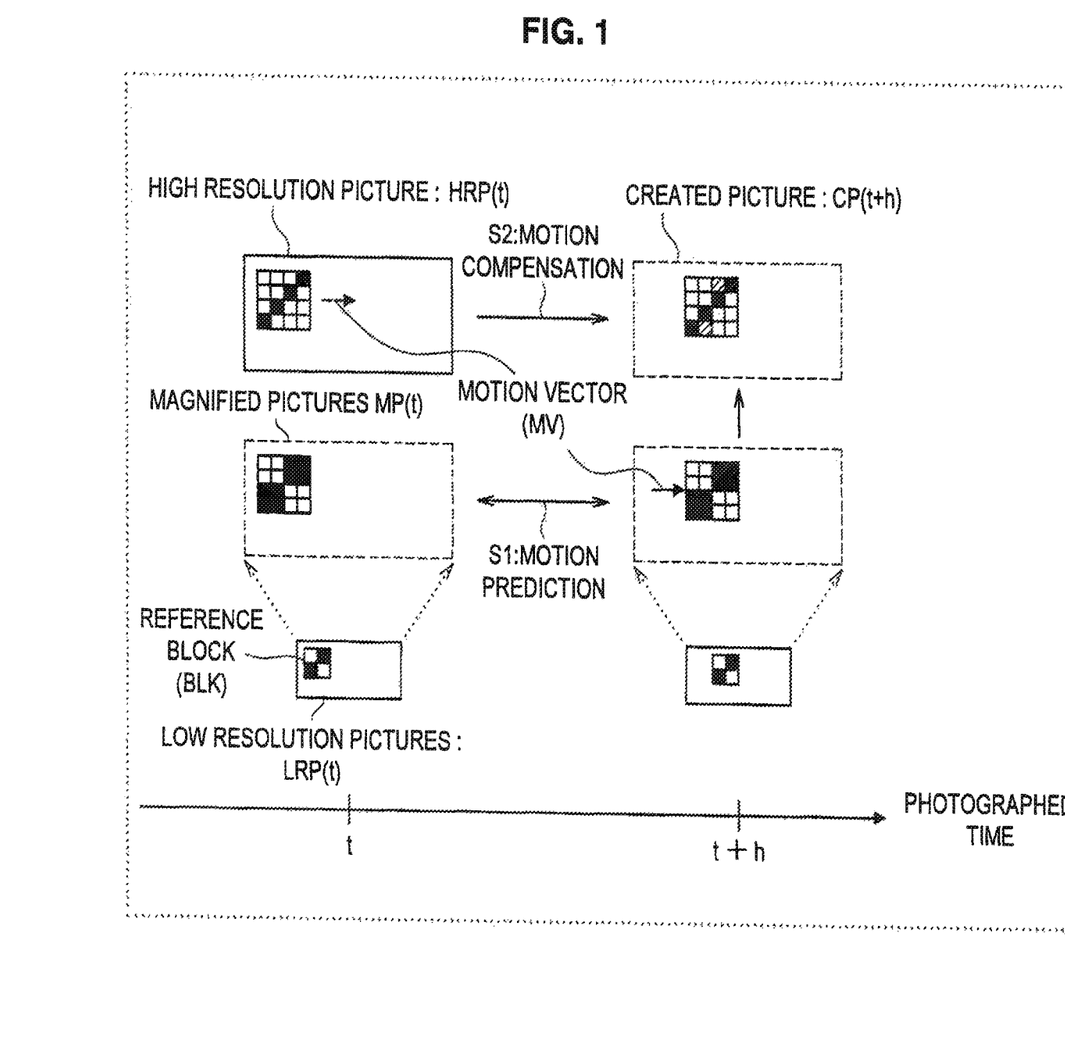
FIG. 1 is an explanatory view describing a generation method of a high resolution created picture.

First, prior to describing an image processing apparatus and an image processing method according to the embodiment of the present invention, an idea of using image data series (hereinafter referred to as moving image data) in which successive videos are recorded at low spatial resolution and image data of high spatial resolution (hereinafter referred to as still image data or HRP (High Resolution Picture)) discretely recorded in correspondence to an appropriate frame (hereinafter referred to as LRP (Low Resolution Picture)) contained in the moving image data to generate image data of high spatial resolution (hereinafter referred to as CP (Created Picture) or high resolution created picture) corresponding to an arbitrary frame contained in the moving image data will be briefly described with reference to FIG. 1. FIG. 1 is an explanatory view showing one example of a generation method of the high resolution image.

In FIG. 1, a high resolution picture HRP(t), low resolution pictures LRP(t), LRP(t+h), magnified pictures MP(t), MP(t+h), and a created picture CP(t+h) are illustrated. The character in the parentheses represent the photographed time. For instance, the created picture CP(t+h) represents the created picture corresponding to the low resolution picture LRP(t+h) photographed at time t+h.

The created picture CP is image data created by motion compensating using the motion vector detected using the low resolution picture LRP and the high resolution picture HRP. As shown in FIG. 1, the motion vector (MV) between time t and time t+h is detected using the magnified picture MP(t) created by magnifying the low resolution picture LRP(t) and the magnified picture MP(t+h) created by magnifying the low resolution picture LRP(t+h) (S1). Then, a reference block of the high resolution picture HRP(t) corresponding to a reference block (BLK) of the low resolution picture LRP(t) is extracted based on the motion vector MV. The pixels of the reference block and the pixels of the magnified picture MP(t+h) are then combined at a predetermined ratio to create the created picture (CP(t+h)) (S2).

In the above-described example, the motion prediction and the motion compensation are executed using substantially different images. The magnified picture MP created by magnifying the low resolution picture LRP magnifies the spatial resolution same as the high resolution picture HRP, but lacks in high frequency component compared to the high resolution picture HRP. Thus, a deviation may occur in the motion vector detected using the magnified picture MP and the motion vector the high resolution picture HRP is to essentially have. If the accuracy of the motion prediction is low, the position of the reference block in the high resolution picture HRP shifts, and thus the noise is added to the high frequency component of the created picture CP created by motion compensation. When executing the motion compensation based a plurality of image data having different spatial resolutions from each other, a technique of suppressing the noise from being added by the motion compensation is desired.

As described below, an image processing apparatus according to one embodiment of the present invention has a function of comparing the reference block of the high resolution picture HRP and the reference block of the magnified picture MP synthesized in motion compensation based on the motion vector, and adaptively switching the process related to motion compensation according to the comparison result when executing the motion compensation based a plurality of image data having different spatial resolutions from each other. Such function can prevent beforehand the noise from being added by the motion compensation.

<One Embodiment of the Present Invention>

An image processing apparatus 100 according to one embodiment of the present invention will be described in detail below.

[Apparatus Configuration of Image Processing Apparatus 100]

Figure 2:
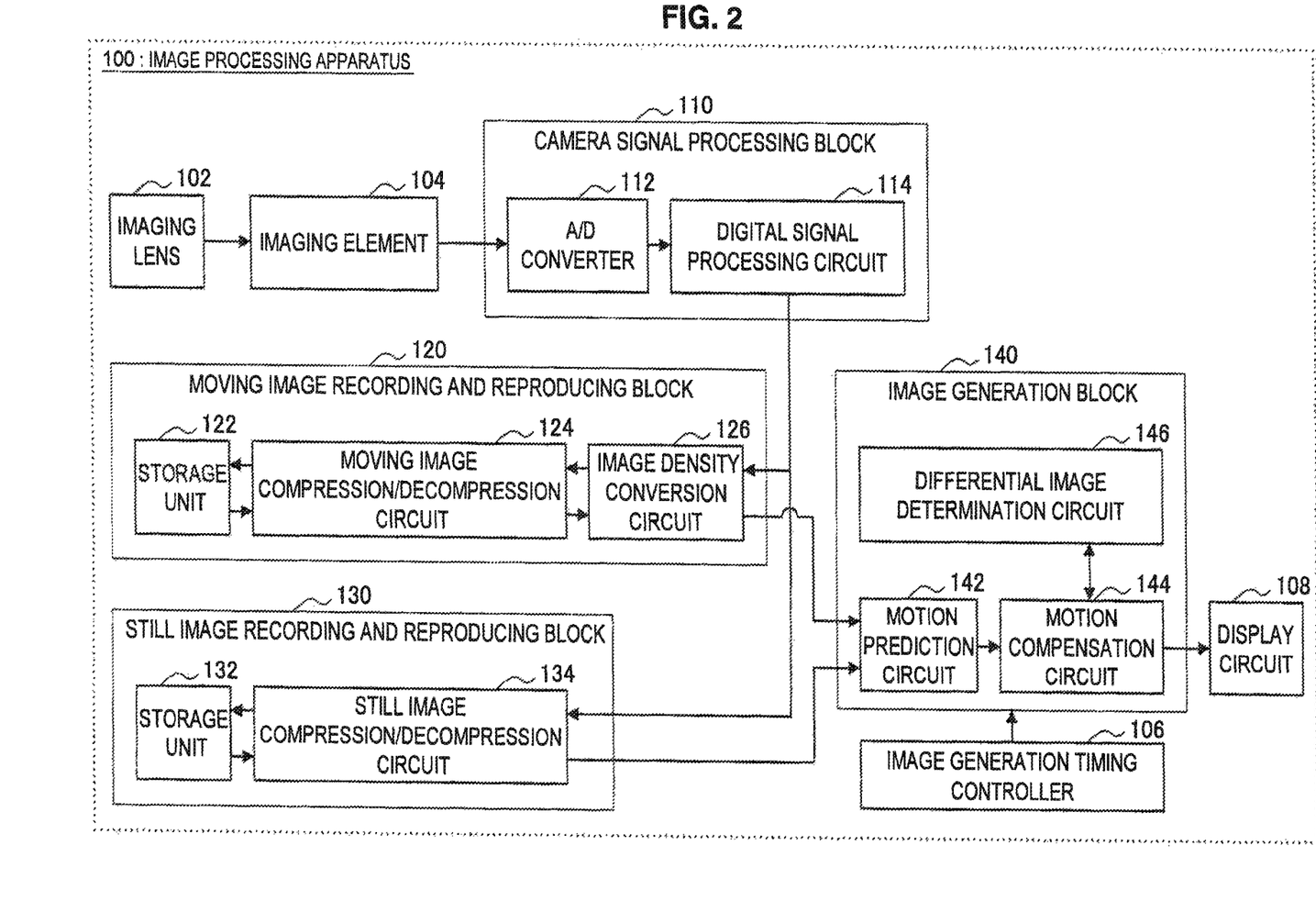
FIG. 2 is an explanatory view showing an apparatus configuration of an image processing apparatus according to one embodiment of the present embodiment.

First, the apparatus configuration of the image processing apparatus 100 according to the present embodiment will be described with reference to FIG. 2. FIG. 2 is an explanatory view showing one example of the apparatus configuration of the image processing apparatus 100 according to the present embodiment.

As shown in FIG. 2, the image processing apparatus 100 mainly includes an imaging lens 102, an imaging element 104, a camera signal processing block 110, a moving image recording and reproducing block 120, a still image recording and reproducing block 130, an image generation block 140, an image generation timing controller 106, and a display circuit 108.

The imaging lens 102 is an optical lens for forming an image (hereinafter referred to as collected image) of a subject by collecting light. The imaging element 104 is a photoelectric element for converting the light collected by the imaging lens 102 to an electrical signal. A semiconductor element such as CCD image sensor (Charge Coupled Device Image Sensor) and CMOS image sensor (Complementary Metal Oxide Semiconductor Image Sensor) is used for the imaging element 104. The imaging element 104 has greater number of pixels than the number of effective pixels of the spatial resolution of the moving image data. The display circuit 108 causes a display device (not shown) to display image data when recording or reproducing the image data or when checking the image data. The image generation timing controller 106 is a device for the operator to make an instruction to acquire the still image data while reproducing the moving image data.

(Camera Signal Processing Block 110)

As shown in FIG. 2, the camera signal processing block 110 includes an A/D converter 112 and a digital signal processing circuit 114.

The A/D converter 112 is an analog-to-digital converter for converting an input analog signal to a digital signal, and outputting the same. The A/D converter 112 converts the analog signal of the collected image input from the imaging element 104 to the digital signal, and inputs the same to the digital signal processing circuit 114. The digital signal processing circuit 114 performs processes such as white balance adjustment and gamma correction on the digital signal (hereinafter referred to as image data) of the collected image input from the A/D converter 112.

(Moving Image Recording and Reproducing Block 120)

As shown in FIG. 2, the moving image recording and reproducing block 120 includes a storage unit 122, a moving image compression/decompression circuit 124, and an image density conversion circuit 126.

The image density conversion circuit 126 performs a decimation process (e.g., inter-frame differential coding etc.) on the series of image data (moving image data) input from the digital signal processing circuit 114 when recording the moving image data. The image density conversion circuit 126 inputs the moving image data of after the decimation process to the moving image compression/decompression circuit 124. The moving image compression/decompression circuit 124 performs compression process on the moving image data of after decimation input from the image density conversion circuit 126 and records the compressed moving image data in the storage unit 122.

When reproducing the moving image data, the moving image compression/decompression circuit 124 reads out the moving image data recorded on the storage unit 122 and performs decompression process thereon. The moving image compression/decompression circuit 124 inputs the decompressed moving image data to the image density conversion circuit 126. The image density conversion circuit 126 performs an interpolation process (e.g., restoring differenced data) on the moving image data input from the moving image compression/decompression circuit 124.

(Still Image Recording and Reproducing Block 130)

As shown in FIG. 2, the still image recording and reproducing block 130 includes a storage unit 132, and a still image compression/decompression circuit 134. The storage unit 132 may realize the function using the storage device common with the storage unit 122.

When recording the still image data, the still image compression/decompression circuit 134 performs compression process on the image data input from the digital signal processing circuit 114 and records in the storage unit 132. When reproducing the still image data, the still image compression/decompression circuit 134 reads out the image data recorded in the storage unit 122 and performs decompression process thereon.

(Image Generation Block 140)

As shown in FIG. 2, the image generation block 140 mainly includes a motion prediction circuit 142, a motion compensation circuit 144, and a differential image determination circuit 146. The motion prediction circuit 142 serves as a motion prediction unit. The motion compensation circuit 144 serves as an image generation unit.

The motion prediction circuit 142 detects the motion vector by executing the motion prediction between frames on the moving image data transmitted from the moving image recording and reproducing block 120. For instance, the motion prediction circuit 142 selects the still image data recorded at the time closest to the frame recorded at a predetermined time. The motion prediction circuit 142 detects the motion vector between frames by executing the motion prediction between the frame corresponding to the still image data and the frame recorded at a predetermined time. In this case, the motion prediction circuit 142 magnifies each frame (LRP) to reference to convert to the magnified picture (MP), and detects the motion vector between the relevant magnified pictures.

As another example, the motion prediction circuit 142 can extract a plurality of still image data recorded at a time point close to the frame recorded at a predetermined time, and then select the frame corresponding to the still image data most approximate to the frame recorded at the predetermined time. The motion prediction circuit 142 may detect the motion vector between frames by executing the motion prediction between the frame corresponding to the selected still image data and the frame recorded at the predetermined time. The motion prediction circuit 142 may detect the motion vector between frames without magnifying each frame (LRP), and magnify the motion vector so as to adapt to the spatial resolution of the created picture (CP).

The motion compensation circuit 144 executes motion compensation based on the information of the motion vector input from the motion prediction circuit 142 and the still image data input from the still image recording and reproducing block 130. For instance, the motion compensation circuit 144 specifies the reference block of the still image data corresponding to the reference block of the frame recorded at the predetermined time based on the motion vector. The motion compensation circuit 144 generates the image data (created picture CP') by combining the specified reference block of the still image data and the reference block of the frame recorded at the predetermined time at a predetermined ratio. The motion compensation circuit 144 outputs the created picture CP' to the differential image determination circuit 146.

The differential image determination circuit 146 compares the created picture CP' input from the motion compensation circuit 144 and the magnified picture MP recorded at the relevant time. The differential image determination circuit 146 generates a differential picture between the magnified picture MP and the created picture CP', or calculates a difference value representing a difference of both pictures (MP, CP'). The differential image determination circuit 146 serves as a difference amount calculation unit.

If the difference of both pictures (MP, CP') is within a tolerable range, the differential image determination circuit 146 controls the motion compensation circuit 144 so as to output the created picture CP' created by motion compensation. If the difference of both pictures (MP, CP') exceeds the tolerable range, the differential image determination circuit 146 controls the motion compensation circuit 144 so as to output the magnified picture MP as is. In this case, the differential image determination circuit 146 switches the control method of the motion compensation circuit 144 according to the magnitude relationship between the difference value and a predetermined set value.

The apparatus configuration of the image processing apparatus 100 according to the present embodiment has been described above. The image processing apparatus 100 can prevent, in advance, generation of noise caused by the prediction accuracy of the motion vector by applying the above-described apparatus configuration.

[Recording Operation of Image Data]

The recording operation of the image data by the image processing apparatus 100 according to the present embodiment will be briefly described below.

First, the operator instructs start of the recording operation to the image processing apparatus 100 (S10). In response to such instruction, the image processing apparatus 100 starts a continuous recording of the frames configuring the moving image data (S12). The image processing apparatus 100 acquires a collected image through the imaging lens 102 (S14). The image processing apparatus 100 performs photoelectric conversion on the collected image by the imaging element 104 to generate an analog signal (S16). The image processing apparatus 100 inputs the analog signal to the A/D converter 112 to convert to a digital signal (S18). The image processing apparatus 100 then inputs the digital signal to the digital signal processing circuit 114, and executes processes such as white balance adjustment and gamma correction on the image data corresponding to such digital signal (S20). The image processing apparatus 100 accumulates the image data, thereby forming the moving image data.

The image processing apparatus 100 performs the decimation process on the moving image data by the image density conversion circuit 126 (S22). When executing step S22, the number of effective pixels in each video signal format such as NTSC (National Television Standard Committee) method, PAL (Phase Alternation by Line) method, or ISDB (Integrated Services Digital Broadcasting) method is obtained. The image processing apparatus 100 then compression processes the moving image data subjected to the decimation process by the moving image compression/decompression circuit 124 (S24), and records in the storage unit 122 (S25). The image processing apparatus 100 also acquires the image data (still image data) intermittently at a predetermined time interval and performs the compression process by the still image compression/decompression circuit 134 (S32), and records in the storage unit 132 (S34).

[Reproducing Operation of Image Data]

The reproducing operation of the image data by the image processing apparatus 100 according to the present embodiment will be briefly described below.

The operator instructs start of the reproducing operation to the image processing apparatus 100 using the image generation timing controller 106 (S50). In response to such instruction, the image processing apparatus 100 starts to generate high image quality image data having a higher spatial resolution than the moving image data and of a recording time point at which the still image data is not recorded (S52). The image processing apparatus 100 reads out the moving image data of after the compression process recorded in the storage unit 122 (S54), and executes the decompression process by the moving image compression/decompression circuit 124 (S56). The image processing apparatus 100 then executes the interpolation process of the moving image data subjected to the decompression process by the image density conversion circuit 126 (S58). According to step S58, each frame of the moving image data is converted to the image data having the same number of pixels as the still image data. The moving image data is then transmitted to the image generation block 140 (S60).

The image processing apparatus 100 then reads out and decompresses the still image data recorded in the storage unit 132 by the still image compression/decompression circuit 134 (S72), and transmits to the image generation block 140 (S74).

(Operation of Image Generation Block 140)

Figure 3:
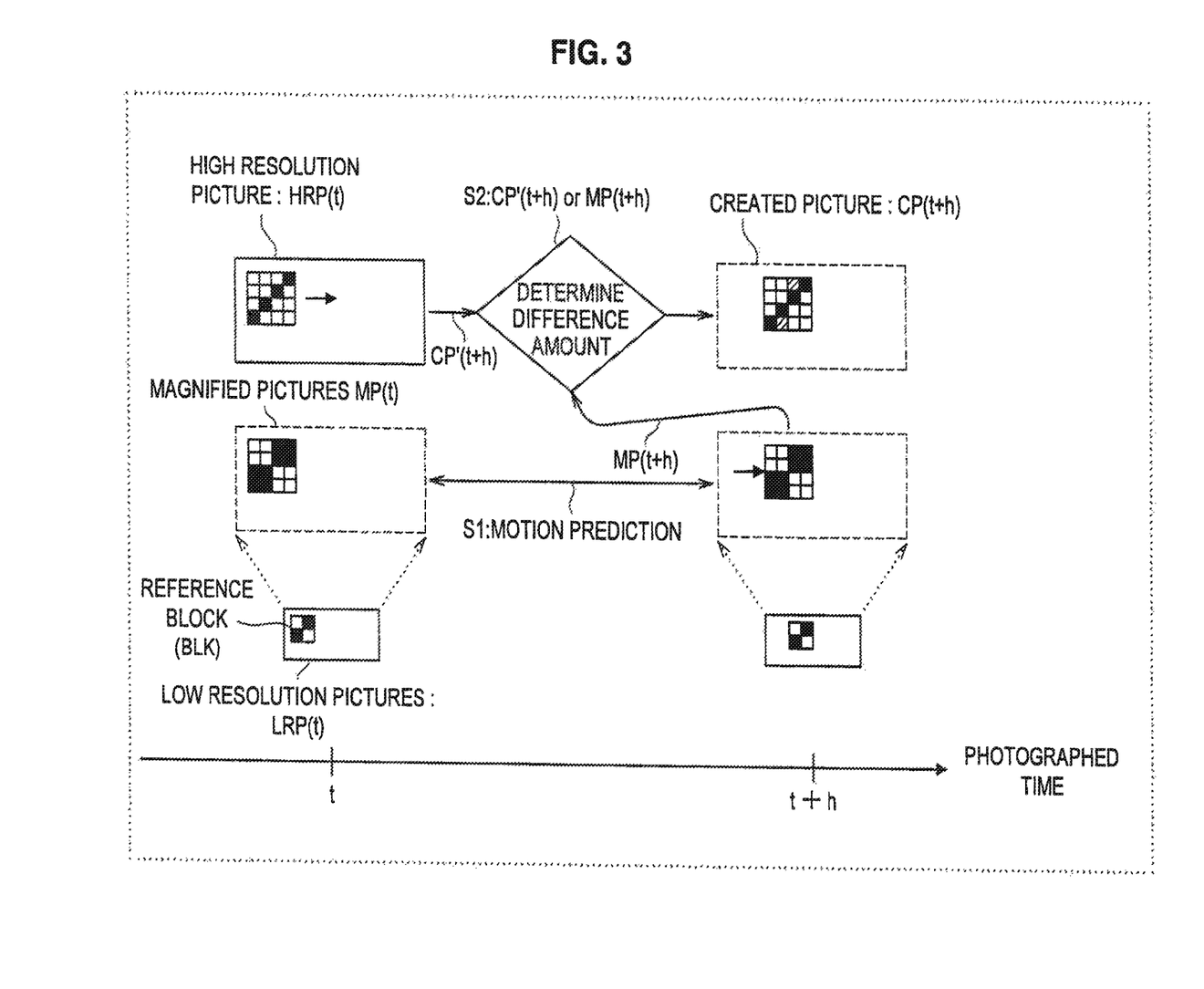
FIG. 3 is an explanatory view describing the operation of an image generation block according to the present embodiment.

The processing operation of the image generation bock 140 will now be described with reference to FIG. 3. FIG. 3 is an explanatory view describing the processing operation of the image generation block 140.

FIG. 3 shows the high resolution picture HRP(t), a plurality of low resolution pictures LRP(t), LRP(t+h), and a created picture CP(t+h) so as to correspond to the photographed time. FIG. 3 specifically describes the processing operation for generating the created picture CP(t+h) corresponding to the low resolution picture LRP(t+h) recorded at time t+h.

The high resolution picture HRP is assumed to have number of horizontal pixels of N, number of vertical pixels of M, and frame rate of $1/\Delta T$[fps]. The low resolution picture LRP is assumed to have number of horizontal pixels of n, number of vertical pixels of m, and frame rate of $1/\Delta t$[fps]. Each variable is assumed to satisfy the relationship of $N \geq n$, $M \geq m$, $\Delta T \geq t$. Furthermore, the variable h is assumed to satisfy the relationship $0 \leq h \leq \Delta T$.

A method of generating the high resolution created picture CP (t+h) of time t+h using the high resolution picture HRP(t) of time t and the low resolution picture LRP(t+h) of time t+h will be described with reference to the example of FIG. 3. The processing method of the image processing apparatus 100 according to the present embodiment is not limited thereto. For instance, the image processing apparatus 100 can generate the created picture CP(t+h) while also referencing the high resolution picture HRP(t+$\Delta T$) of another time t+$\Delta T$ (not shown). In this case, the image processing apparatus 100 may perform the process of selecting the high resolution picture HRP to reference according to the magnitude, the speed, and the like of the motion of the subject.
(S1)

First, the image processing apparatus 100 executes the motion prediction using the low resolution pictures LRP(t) and LRP(t+h) by the motion prediction circuit 142. In this case, the motion prediction circuit 142 magnifies the low resolution pictures LRP(t) and LR(t+h) to generate the magnified pictures MP(t) and MP(t+h). The motion prediction circuit 142 compares the magnified pictures MP(t) and MP(t+h) to detect the motion vector MV between MP(t) and MP(t+h). The applicable motion prediction method includes block matching method, phase correlation method, optical flow method, or the like.
(S2)

The image processing apparatus 100 then executes the motion compensation using the motion vector MV and the high resolution picture HRP(t) by the motion compensation circuit 144. The motion compensation circuit 144 uses the motion vector MV to specify the reference block of the high resolution picture HRP(t) corresponding to the reference block of the magnified picture MP(t+h). The motion compensation circuit 144 combines such reference block and the reference block of the magnified picture MP(t+h) at a predetermined ratio, and tentatively generates the created picture CP'(t+h).

If the motion prediction and the motion compensation are performed between the same images, the occurrence of noise in the created picture CP(t+h) due to the motion prediction accuracy is small even if the created picture CP'(t+h) is output as the created picture CP(t+h). However, since the image processing apparatus 100 according to the present embodiment performs the motion prediction using the low resolution picture LRP, the noise may possibly occur in the information of the high frequency component contained in the high resolution picture HRP when performing the motion compensation using the high resolution picture HRP. That is, there is a possibility the correlation between the reference block of the high resolution picture HRP used in the motion compensation and the reference block of the magnified picture MP corresponding thereto may lower depending on the accuracy of the motion prediction.

For instance, even if the high resolution picture HRP and the low resolution picture LRP are recorded on the same time, the low resolution picture LRP does not contain the high frequency component contained in the high resolution picture HRP. Thus, it is difficult to accurately predict the motion vector obtained through comparison of the high resolution picture even if the motion prediction is executed with the low resolution picture LRP magnified to the spatial resolution same as the high resolution picture HRP. Furthermore, it is difficult to accurately predict the motion vector even if the motion vector detected by comparing the low resolution picture LRP without decompressing is magnified since the information equivalent to the high frequency component is not contained in the low resolution picture LRP.

The image processing apparatus 100 according to the present embodiment thus includes the differential image determination circuit 146 for performing a control such that when the correlation of the reference block of the high resolution picture HRP used in the motion compensation and the magnified picture MP corresponding thereto is low, the image subjected to motion compensation is not used for the frame thereof.

The differential image determination circuit 146 calculates a difference amount by comparing the tentatively generated created picture CP'(t+h) and the magnified picture MP(t+h). If the difference amount is greater than a predetermined value, the differential image determination circuit 146 determines that the correlation of the pictures (CP', MP) is low, and outputs the magnified picture MP(t+h) as is for the created picture CP(t+h). If the difference amount is smaller than the predetermined value, the differential image determination circuit 146 determines that the correlation of the pictures (CP', MP) is high, and outputs the created picture CP'(t+h) for the created picture CP(t+h). As a result, the differential image determination circuit 146 can reduce the noise that occurs in the high frequency component due to the prediction accuracy of the motion vector.

(Operation Flow of Differential Image Determination Circuit 146)

Figure 4:
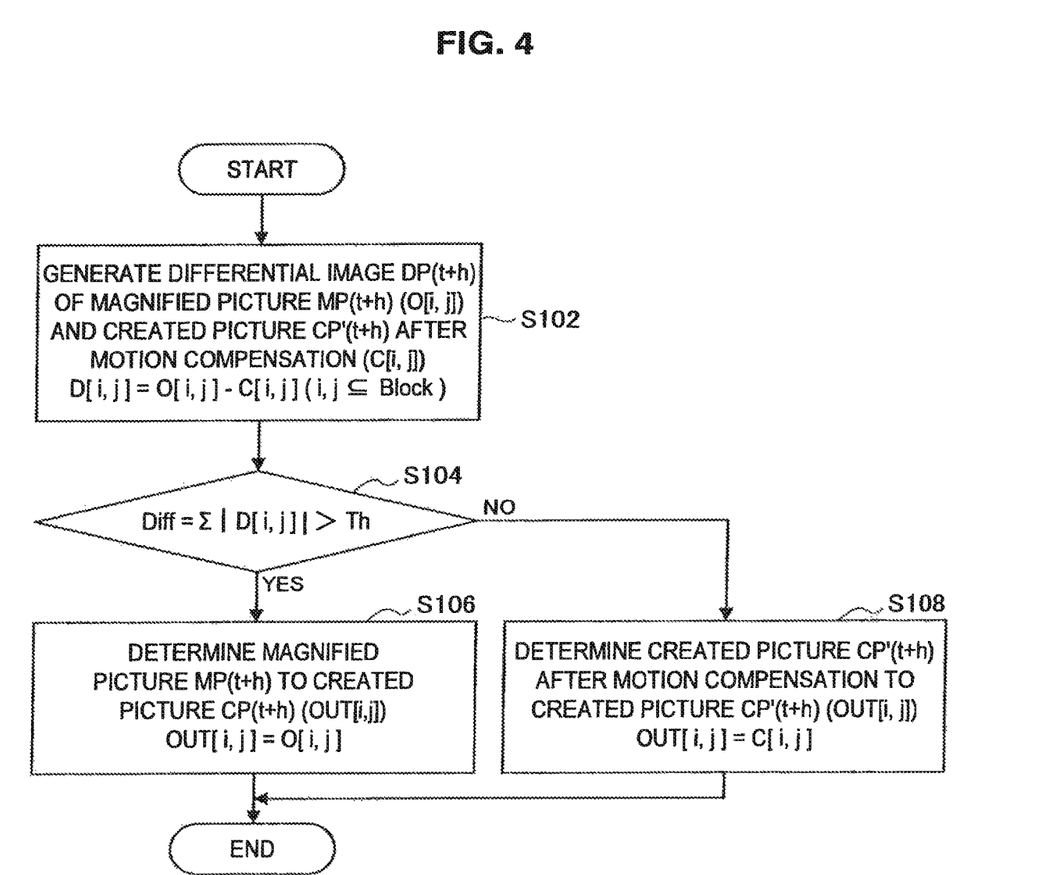
FIG. 4 is an explanatory view showing the operation flow of a differential image determination circuit according to the present embodiment.

The operation flow of the differential image determination circuit 146 according to the present embodiment will be described below with reference to FIG. 4. FIG. 4 is an explanatory view showing the operation flow of the differential image determination circuit 146 according to the present embodiment.

First, the differential image determination circuit 146 calculates a difference amount D between the reference block O (reference value O[i, j]) of the magnified picture MP(t+h) and the reference block C (reference value C[i, j]) of the high resolution picture HRP(t) based on the motion vector (reference block O→reference block C) detected by the motion prediction circuit 142 (S102). The differential image determination circuit 146 can calculate the difference amount D[i, j] using the method of MSE method (Mean Square Error method) or the SAD method (Sum of Absolute Difference method). When using the SAD method, the differential image determination circuit 146 calculates the difference amount D according to equation (1).

$$D=\Sigma|O[i,j]-C[i,j]| \quad (1)$$

Here, i and j are indices representing the pixel position in the horizontal and vertical directions, respectively, contained in a unit block referenced in motion prediction. The sum of equation (1) relates to the position i, j of all pixels contained in the unit block.

The differential image determination circuit 146 then compares a predetermined set parameter Th (hereinafter referred to as threshold value) and the difference amount D, and determines the magnitude relation thereof (S104). The threshold value Th may be changed, as necessary. For instance, the threshold value Th is set to a relatively large value when assuming a situation where a fast moving subject is contained in the image data, a situation where a complex pattern is container, and the like. Such situations are situations where the accuracy of the motion prediction tends to lower, and the difference amount D tends to be a relatively large value. Thus, in such situation, the threshold value Th is preferably set relatively large to extend the application range of the image processing method according to the present embodiment.

When the determination result D>Th, this result indicates that the reference block C and the reference block O are greatly different. This difference occurs when mistaken motion compensation is performed as the accuracy of the motion prediction is low, or when the subject that did not exist at time t appears at time t+h. As a result, the image processing apparatus 100 is difficult to compensate the high frequency component contained in the high resolution picture HRP(t) with respect to the magnified picture MP(t+h). The differential image determination circuit 146 thus sets the reference block O to the created picture CP(t+h) (reference value OUT[i, j]=O[i, j]) to prevent generation of noise (S106).

When the determination result is D≤Th, this result indicates that the reference block C and the reference block O have high correlation. Thus, the image processing apparatus 100 can compensate the high frequency component contained in the high resolution picture HRP(t) with respect to the magnified picture MP (t+h) using motion compensation. The differential image determination circuit 146 thus compensates the reference block O of the magnified picture MP(t+h) using the reference block C, and sets the compensated image to the created picture CP(t+h) (reference value OUT[i, j]=C[i, j]) to prevent generation of noise (S108).

As described above, the differential image determination circuit 146 can prevent the noise from generating due to low accuracy of the motion prediction by comparing and evaluating, in advance, the reference blocks corresponding to the reference source and the reference destination of the motion vector. As a result, the image processing apparatus 100 according to the present embodiment prevents noise without performing the motion compensation when the accuracy of motion prediction is low such as when the noise generates, and generates high image quality image data by performing motion compensation in other cases. As a result, the image processing apparatus 100 can generate image data series of higher image quality when performing motion compensation using the image data series having different spatial resolutions.

(Image Processing Method)

Figure 5:
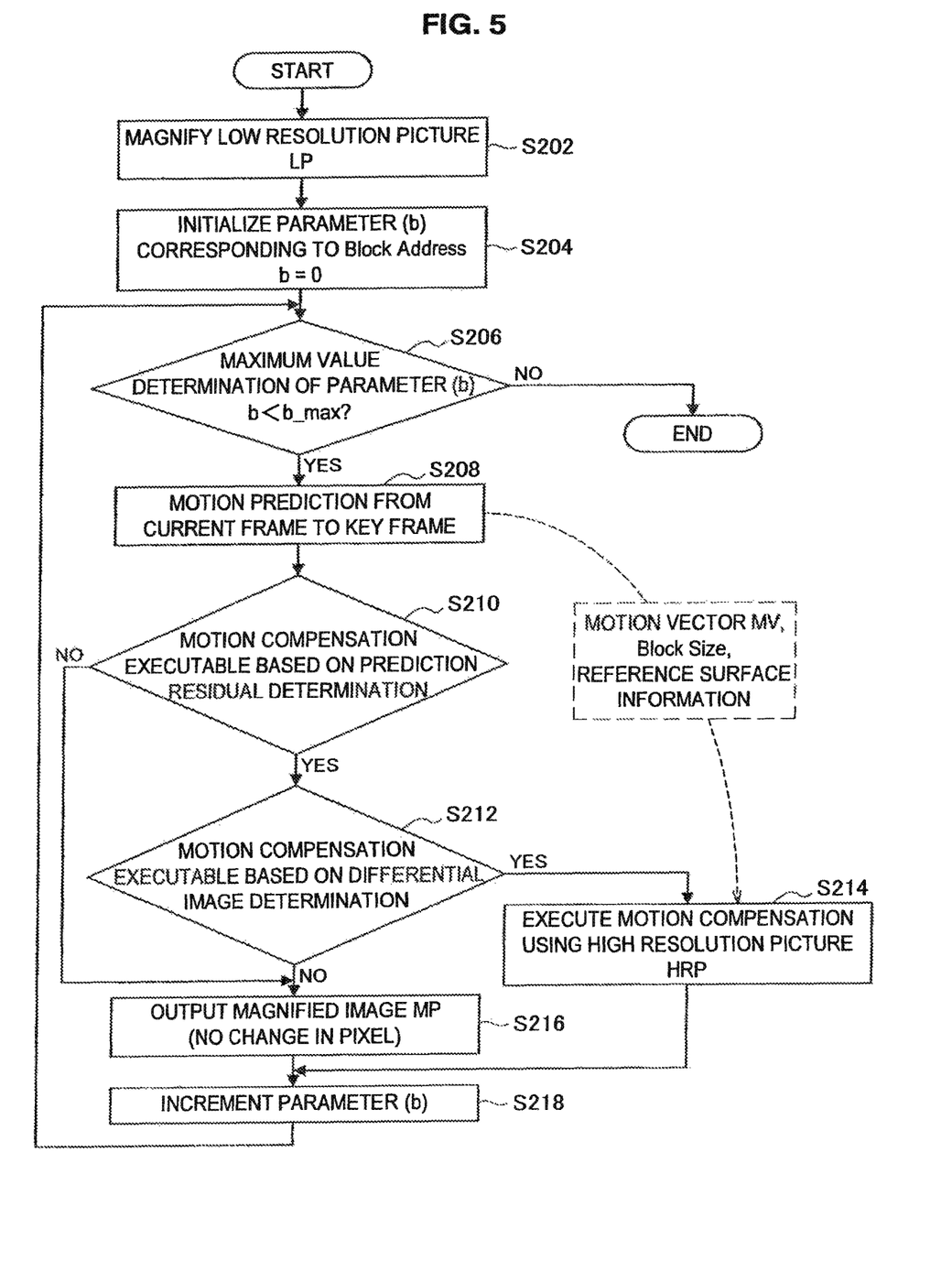
FIG. 5 is an explanatory view describing the operation of an image generation block according to the present embodiment.

The image processing method according to the present embodiment will now be described with reference to FIG. 5. FIG. 5 is an explanatory view describing a flow of image generation process according to the present embodiment.

First, the motion prediction circuit 142 magnifies the low resolution picture LRP to generate a magnified picture MP having the same spatial resolution as the high resolution picture HRP (S202). The parameter b indicating the position of the reference block is then initialized (S204). Whether or not the parameter b exceeds a maximum value b_max of the parameter b is then determined (S206). Here, b_max is the number of blocks contained in the frame.

If b≥b_max, the image generation block 140 terminates the image generation process. If b<b_max, the motion prediction circuit 142 executes motion prediction from a current frame (MP(t)) to a key frame (MP(t+h)) (S208). The image generation block 140 then determines whether or not the execution of the motion compensation is possible based on the magnitude of a prediction residual signal (S210).

If determined that the execution of the motion compensation is not possible in step S210, the motion compensation circuit 144 outputs the magnified picture MP(t+h) of step S202 as the created picture CP(t+h) (S216). If determined that the execution of the motion compensation is possible in step S210, the motion compensation circuit 144 executes a differential image determination (determination of "D>Th" or "D≤Th") using the resolution picture HRP(t) and the magnified picture MP(t+h), and determines whether or not the execution of the motion compensation is possible (S212).

If determined that the execution of the motion compensation is possible in step S212, the motion compensation circuit 144 executes the motion compensation using the high resolution picture HRP(t) (S214). In this case, the motion compensation circuit 144 uses the motion vector from the current frame to the key frame obtained in step S208, the unit block size, the reference frame information, or the like. If determined that the execution of the motion compensation is not possible in step S212, the motion compensation circuit 144 outputs the magnified picture MP(t+h) as the created picture CP(t+h) (S216).

The image generation block 140 then increments the parameter b (S218), and again executes the processes from step S206. The image generation block 140 then determines whether or not the execution of the motion compensation is possible while executing the differential image determination in motion compensation. The image generation block 140 thus can suppress noise from generating in the created picture CP(t+h) due to motion compensation.

The image processing apparatus 100 according to the present embodiment has been described above. As described above, the image processing apparatus 100 according to the present embodiment includes the differential image determination circuit 146, and can switch the image data to output as the created picture CP according to the accuracy of the motion prediction. As a result, the image processing apparatus 100 can generate high image quality created picture CP regardless of the accuracy of motion prediction when executing the motion prediction and the motion compensation using the image data series having different spatial resolutions. The differential image determination circuit 146 can also be used in detecting whether or not noise generates in the created picture CP due to the accuracy of motion prediction.

The function realized by each configuring elements of the image processing apparatus 100 can be realized by a predetermined program using an information processing device described below.

[Hardware Configuration]

Figure 6:
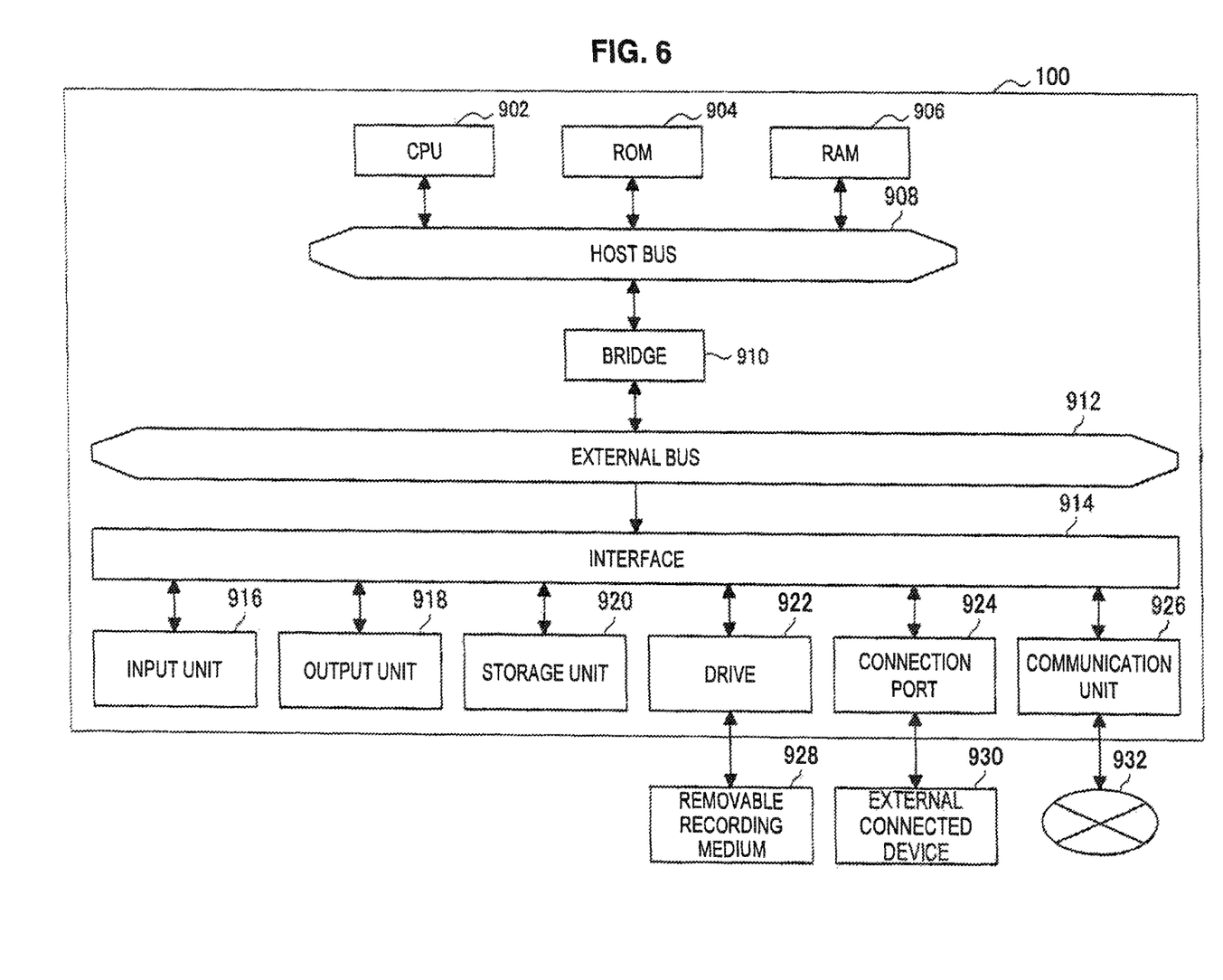
FIG. 6 is an explanatory view showing a hardware configuration example of an information processing device capable of realizing the functions of the image processing apparatus according to the present embodiment.

The functions of the image processing apparatus 100 can be realized by an information processing apparatus having the hardware configuration shown in FIG. 6. FIG. 6 is an explanatory view showing a hardware configuration example of an information processing apparatus capable of realizing the function of each configuring elements of the image processing apparatus 100.

As shown in FIG. 6, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage unit 920, a drive 922, a connection port 924, and a communication unit 926.

The CPU 902 functions as an arithmetic processing unit or a control unit and controls an entire operation of the constituent elements or some of the constituent elements on the basis of various programs recorded on the ROM 904, the RAM 906, the storage unit 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These constituent elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (so-called remote) that can transmit a control signal by using an infrared ray or other radio waves. The input unit 916 includes an input control circuit or the like to transmit information input by using the operation unit to the CPU 902 through an input signal.

The output unit 918 is, for example, a display device such as a CRT (Cathode Ray Tube), an LCD (Liquid Crystal Display), a PDP (Plasma Display Panel), or an ELD (Electro-Luminescence Display), an audio output device such as a loudspeaker or headphones, a printer, a mobile phone, or a facsimile that can visually or auditorily notify a user of acquired information.

The storage unit 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removal recording medium 928 such as a magnetic disk, an optical disk, a magnetooptical disk, or a semiconductor memory or writes information in the removal recording medium 928. The removal recording medium 928 is, for example, a DVD medium, a Blue-ray medium, an HD-DVD medium, a compact flash (CF; compactFlash) (registered trademark), a memorystick, or an SD memory card (Secure Digital memory card), or the like. As a matter of course, the removal recording medium 928 may be, for example, an IC card (Integrated Circuit Card) on which a non-contact IC chip is mounted, an electronic device, or the like.

The connection port 924 is a port such as an USB (Universal Serial Bus) port, an IEEE1394 port, an SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used. The network 932 connected to the communication unit 926 includes a wiredly or wirelessly connected network. For example, the Internet, a home-use LAN, infrared communication, broadcasting, satellite communication, or the like is used.

It should be understood by those skilled in the art that various modifications, combinations, sub-combinations and alterations may occur depending on design requirements and other factors insofar as they are within the scope of the appended claims or the equivalents thereof.

For instance, in the description of the above-described embodiment, a method of executing the motion prediction and the motion compensation with reference to the backward frame has been described, but the technical scope of the invention is not limited thereto, and the motion prediction and the motion compensation may be executed with reference to the forward frame or the forward and backward frames.

[Variant]

Figure 7:
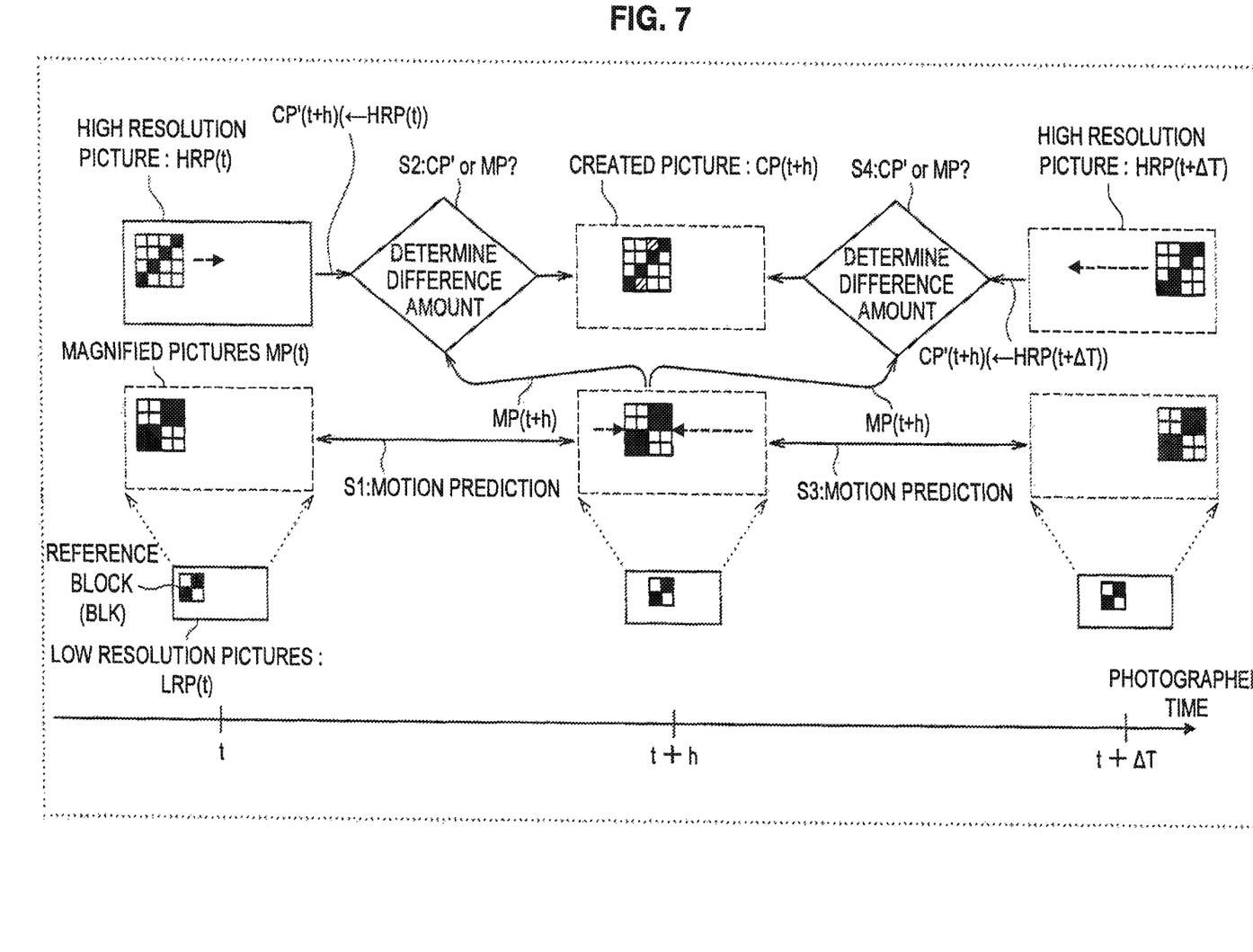
FIG. 7 is an explanatory view describing a method of generating a high resolution image according to one variant of the present embodiment.

A method of generating a high image quality image by executing a process of motion prediction/motion compensation based on the forward and backward frames will be described with reference to FIG. 7. FIG. 7 is an explanatory view describing a method of generating a high image quality image by sequentially executing the process of motion prediction/motion compensation based on forward and backward frames. As shown in FIG. 7, if the high resolution picture HRP is recorded around the desired photographed time, the motion compensation can be performed using the magnified picture MP(t+h) and the high resolution pictures HRP(t) and HRP(t+h).

However, if noise generates in the tentative created picture CP'(t+h) generated from either high resolution picture HRP, the noise also generates in the ultimately generated created picture CP(t+h). Thus, the created picture CP(t+h) can be generated using only the tentative created picture CP'(t+h) having high correlation with the magnified picture MP(t+h). Consequently, cases where motion compensation can be applied increase, so that the user can generate the image data series of higher image quality.

The invention claimed is:

1. An image processing apparatus, comprising:
a receiving unit configured to receive first video data containing a plurality of frames having a first resolution and second video data containing a plurality of frames having a second resolution higher than the first resolution;
a motion prediction unit configured to detect a motion vector between the frames contained in the first video data received by the receiving unit;
a difference amount calculation unit configured to calculate a difference amount between a reference block of a frame of the first video data having the first resolution and a reference block of a frame of the second video data having the second resolution higher than the first resolution, wherein the difference amount is a value representing a difference between the reference block of the frame of the first video data having the first resolution and the reference block of the frame of the second video data having the second resolution higher than the first resolution; and
an image generation unit configured to
perform a process associated with motion compensation by generating, based on the frame of the second video data having the second resolution and the motion vector detected by the motion prediction unit, motion compensated image data having a same resolution as the second video data having the second resolution, and to output the motion compensated image data as a result of the motion compensation when the difference amount calculated by the difference amount calculation unit is smaller than a predetermined value, and suppress occurrence of noise due to motion vector prediction accuracy in information of a high frequency component contained in the second video data by preventing a shift in a position of the reference block of the frame of the second video data utilized in the process associated with motion compensation, wherein the process associated with motion compensation is adaptively switched and outputting a picture, created by modifying the frame of the first video data, as the result of the motion compensation instead of outputting the motion compensated image data as the result of the motion compensation, when the difference amount is not smaller than the predetermined value and the process associated with motion compensation is adaptively switched, and wherein the receiving unit, the motion prediction unit, the difference amount calculation unit, and the image generation unit are each implemented via at least one processor.

2. The image processing apparatus according to claim 1, wherein the image generation unit is further configured to generate a frame of video data in which the frame of the first video data is magnified to a same spatial resolution and having a same pixel density as the frame of the second video data when the difference amount calculated by the difference amount calculation unit is not smaller than the predetermined value.

3. The image processing apparatus according to claim 2, wherein the motion prediction unit detects the motion vector between magnified frames of the frames contained in the first video data received by the receiving unit, the magnified frames having a same resolution as the second resolution.

4. The image processing apparatus according to claim 2, wherein the difference amount calculation unit calculates a difference amount between a magnified frame of the first video data and the frame of the second video data, the magnified frame having a same resolution as the second resolution.

5. The image processing apparatus according to claim 2, wherein the image generation unit generates, based on the frame of the second video data and the motion vector detected by the motion prediction unit, the frame of video data in which the frame of the first video data is magnified to have a same number of pixels as the frame of the second video data when the difference amount calculated by the difference amount calculation unit is greater than the predetermined value.

6. The image processing apparatus according to claim 1, wherein the image generation unit is further configured to change a ratio of combining the frame of the first video data, which is a reference source of the motion vector, and the frame of the second video data, which is a reference destination of the motion vector, according to the difference amount calculated by the difference amount calculation unit when performing the motion compensation when the difference amount calculated by the difference amount calculation unit is greater than the predetermined value.

7. The image processing apparatus according to claim 1, wherein
the first video data has higher temporal resolution than the second video data, and
the second video data has lower temporal resolution than the first video data.

8. The image processing apparatus according to claim 1, wherein the difference amount calculation unit calculates a difference amount between a block of the frame of the first video data and a block of the frame of the second video data.

9. The image processing apparatus according to claim 1, wherein the difference amount is calculated by a Mean Square Error (MSE) between the frame of the first video data and the frame of the second video data.

10. The image processing apparatus according to claim 1, wherein the difference amount is calculated by a Sum of Absolute Difference (SAD) between the frame of the first video data and the frame of the second video data.

11. The image processing apparatus according to claim 1, wherein the difference amount is calculated by generating a differential picture between the frame of the first video data and the frame of the second video data.

12. An image processing method, comprising:
receiving first video data containing a plurality of frames having a first resolution and second video data containing a plurality of frames having a second resolution higher than the first resolution;

detecting a motion vector between the frames contained in the received first video data;

calculating a difference amount between a reference block of a frame of the first video data having the first resolution and a reference block of a frame of the second video data having the second resolution higher than the first resolution, wherein the difference amount is a value representing a difference between the reference block of the frame of the first video data having the first resolution and the reference block of the frame of the second video data having the second resolution higher than the first resolution;

performing a process associated with motion compensation by generating, based on the frame of the second video data having the second resolution and the detected motion vector, motion compensated image data having a same resolution as the second video data having the second resolution, and outputting the motion compensated image data as a result of the motion compensation when the difference amount calculated in the difference amount calculation step is smaller than a predetermined value;

suppressing occurrence of noise due to motion vector prediction accuracy in information of a high frequency component contained in the second video data by preventing a shift in a position of the reference block of the frame of the second video data utilized in the process associated with motion compensation, wherein the process associated with motion compensation is adaptively switched and outputting a picture, created by modifying the frame of the first video data, as the result of the motion compensation instead of outputting the motion compensated image data as the result of the motion compensation, when the difference amount is not smaller than the predetermined value and the process associated with motion compensation is adaptively switched.

13. A non-transitory computer-readable storage medium having embodied thereon a program, which when executed by a computer causes the computer to execute a method, the method comprising:
receiving first video data containing a plurality of frames having a first resolution and second video data containing a plurality of frames having a second resolution higher than the first resolution;

detecting a motion vector between the frames contained in the received first video data;

calculating a difference amount between a reference block of a frame of the first video data having the first resolution and a reference block of a frame of the second video data having the second resolution higher than the first resolution, wherein the difference amount is a value representing a difference between the reference block of the frame of the first video data having the first resolution and the reference block of the frame of the second video data having the second resolution higher than the first resolution;

performing a process associated with motion compensation by generating, based on the frame of the second video data having the second resolution and the detected motion vector, motion compensated image data having a same resolution as the second video data having the second resolution, and outputting the motion compensated image data as a result of the motion compensation when the difference amount calculated in the difference amount calculation step is smaller than a predetermined value;

suppressing occurrence of noise due to motion vector prediction accuracy in information of a high frequency component contained in the second video data by preventing a shift in a position of the reference block of the frame of the second video data utilized in the process associated with motion compensation, wherein the process associated with motion compensation is adaptively switched and outputting a picture, created by modifying the frame of the first video data, as the result of the motion compensation instead of outputting the motion compensated image data as the result of the motion compensation, when the difference amount is not smaller than the predetermined value and the process associated with motion compensation is adaptively switched.

14. The image processing apparatus according to claim 1, wherein the first resolution of the plurality of frames of the first video data is a higher temporal resolution than the second resolution of the plurality of frames of the second video data.

15. The image processing method according to claim 12, wherein the first resolution of the plurality of frames of the first video data is a higher temporal resolution than the second resolution of the plurality of frames of the second video data.

16. The non-transitory computer-readable storage medium according to claim 13, wherein the first resolution of the plurality of frames of the first video data is a higher temporal resolution than the second resolution of the plurality of frames of the second video data.

* * * * *